United States Patent [19]

Leroy

[11] Patent Number: 4,579,449
[45] Date of Patent: Apr. 1, 1986

[54] SUPPLY HOPPER FOR CONTINUOUS FORMS

[75] Inventor: Robert D. Leroy, Rochester, N.Y.

[73] Assignee: Eastman Kodak Company, Rochester, N.Y.

[21] Appl. No.: 640,481

[22] Filed: Aug. 13, 1984

Related U.S. Application Data

[63] Continuation of Ser. No. 464,291, Feb. 7, 1983, abandoned.

[51] Int. Cl.⁴ ............................................. G03B 27/62
[52] U.S. Cl. ...................................... 355/75; 355/354
[58] Field of Search ................. 355/3 SH, 14 SH, 50, 355/51, 75; 226/101, 102, 79, 74

[56] References Cited

U.S. PATENT DOCUMENTS

| | | | |
|---|---|---|---|
| 3,289,529 | 12/1966 | Darthenay | 355/50 |
| 3,735,975 | 5/1973 | Sukel et al. | 355/50 X |
| 4,087,172 | 5/1978 | Van Dongen | 355/50 X |
| 4,264,200 | 4/1981 | Tickner et al. | 355/75 |
| 4,300,710 | 11/1981 | Du Bois et al. | 355/75 X |
| 4,439,036 | 3/1984 | Davis et al. | 355/75 |

*Primary Examiner*—Richard A. Wintercorn
*Attorney, Agent, or Firm*—Lawrence P. Kessler

[57] ABSTRACT

A supply hopper for continuous forms, such supply hopper being collapsable to a compact storage position, and which, in its operative continuous forms stacking position, prevents double feeds. The supply hopper comprises a support for a stack of continuous forms. A side member is pivotally connected to the support for movement to a storage position overlying the support and an operative position relative (substantially perpendicular) to the support. A continuous forms guide is operatively coupled to the side member and cooperates therewith, so that when the side member is in its operative position the guide prevents double feed of such continuous forms, and when the side member is in its storage position forms a flat surface with the member.

10 Claims, 5 Drawing Figures

4,579,449

SUPPLY HOPPER FOR CONTINUOUS FORMS

RELATED APPLICATION

This application is a continuation of U.S. patent application Ser. No. 464,291, filed Feb. 7, 1983, now abandoned.

BACKGROUND OF THE INVENTION

This invention relates generally to continuous forms feeders, and more particularly to a supply hopper which, in an operative position, supports continuous forms and prevents double feeds thereof, and is collapsable to a storage position.

It is common practice to print computer information output on a continuous run of paper. Such paper is typically an elongated web divided into uniform lengths, or panels, in the longitudinal direction, by transverse weakening lines formed for example by perforations. The web is stored as a stack by folding the web along the weakening lines with alternate lines forming opposing edges of the stack. This is commonly referred to as fanfold paper or continuous forms.

In printing computer information output on continuous forms, the continuous forms are fed from the stack to a line or page printer where it is imprinted and then discharged into a receptacle in a manner to reform the stack. Duplicates of selected panels of the stack can be made by dividing the continuous forms into individual sheets by separating the forms along the weakening lines and copying the selected sheets. Alternatively, the entire stack, or a portion thereof, can be duplicated by feeding the continuous forms from the stack by a conveyor to a reproduction apparatus for copying and discharging the continuous forms into a receptacle in a manner to reform the stack (see, for example, U.S. Pat. Nos. 4,087,172 issued May 2, 1978, in the name of Van-Dongen, or 4,264,200 issued April 28, 1981 in the names of Tickner et al).

When printing computer information output on continuous forms or reproducing the information contained on the continuous forms, the supply stack must be supported and fed in a manner to properly guide the continuous forms to the printer or reproduction apparatus one panel at a time. That is, feeding of overlapped adjacent panels (double feed) should be prevented. If the printer or reproduction is not dedicated to handling continuous forms (i.e., can receive input information from other sources), the supply hopper must be an auxiliary piece of equipment. This requires such supply hopper to be selectively mountable on the printer or reproduction apparatus, thus involving additional set up time. On the other hand, if the supply hopper is permanently fixed to the printer or reproduction apparatus, it may interfere with the operation of the printer or reproduction apparatus when operating in modes other than on continuous forms.

SUMMARY OF THE INVENTION

This invention is directed to a supply hopper for continuous forms, such supply hopper being collapsable to a compact storage position and which in its operative continuous forms stacking position prevents double feeds. The supply hopper comprises a support for a stack of continuous forms. A side member is pivotally connected to the support for movement to a storage position overlying the support and an operative position relative (substantially perpendicular) to the support. A continuous forms guide is operatively coupled to the side member and cooperates therewith, so that when the side member is in its operative position the guide prevents double feed of such continuous forms, and when the side member is in its storage position forms a flat surface with the member.

The invention, and its objects and advantages, will become more apparent in the detailed description of the preferred embodiment presented below.

BRIEF DESCRIPTION OF THE DRAWINGS

In the detailed description of the preferred embodiment of the invention, reference is made to the accompanying drawings, in which.

DESCRIPTION OF THE PREFERRED EMBODIMENT

Figure 1:
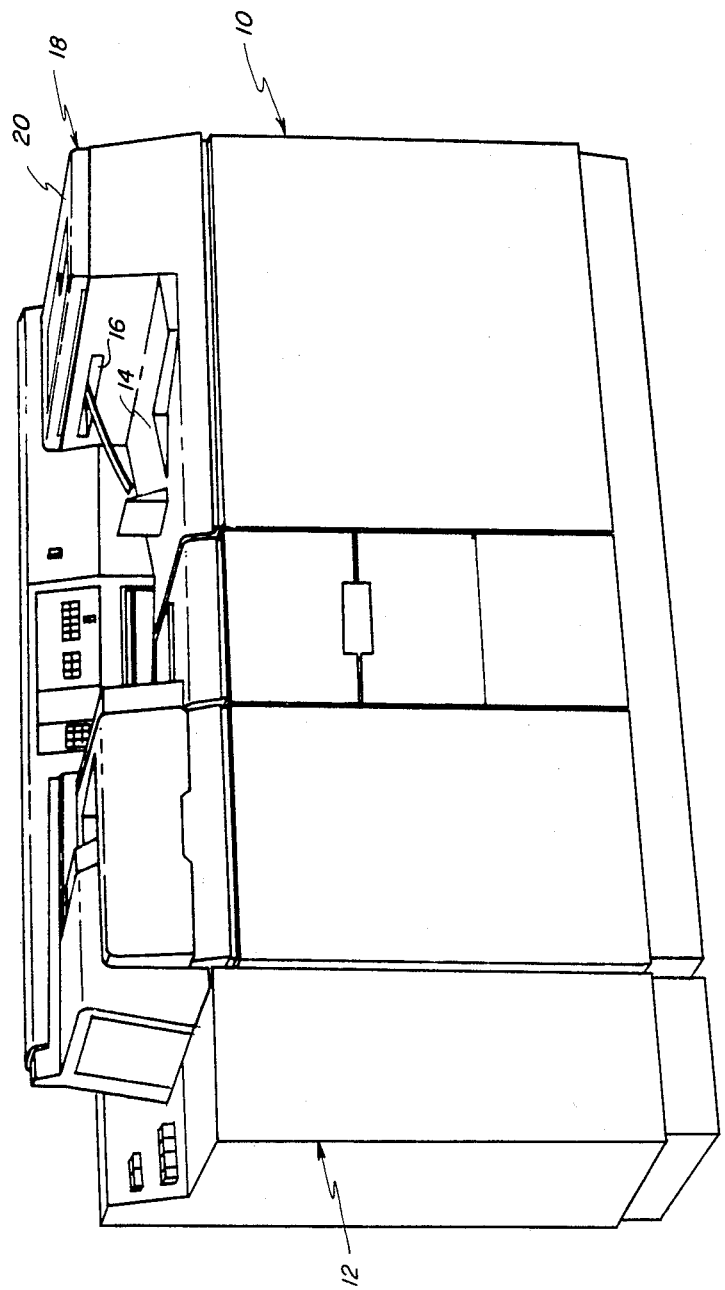
FIG. 1 is a view, in perspective, of an exemplary reproduction apparatus having a continuous forms supply hopper, according to this invention, such hopper being in its storage position.
Figure 2:
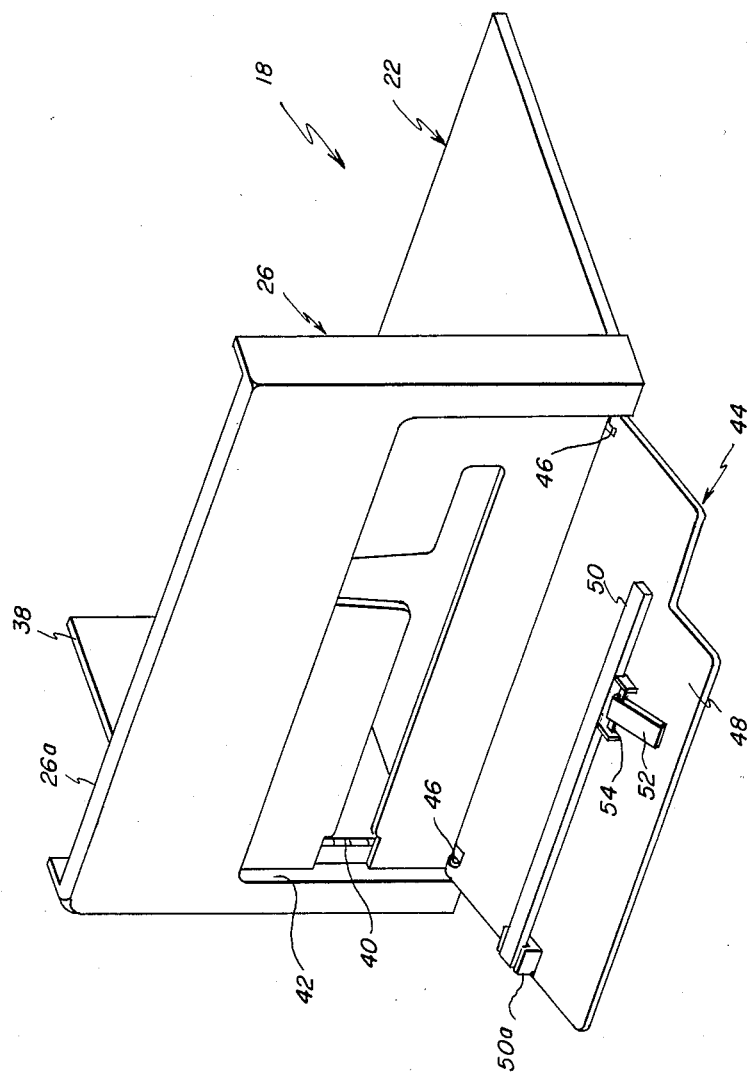
FIG. 2 is a view, in perspective and on an enlarged scale, of the continuous forms supply hopper in its operative position to support a stack of continuous forms.
Figure 4:
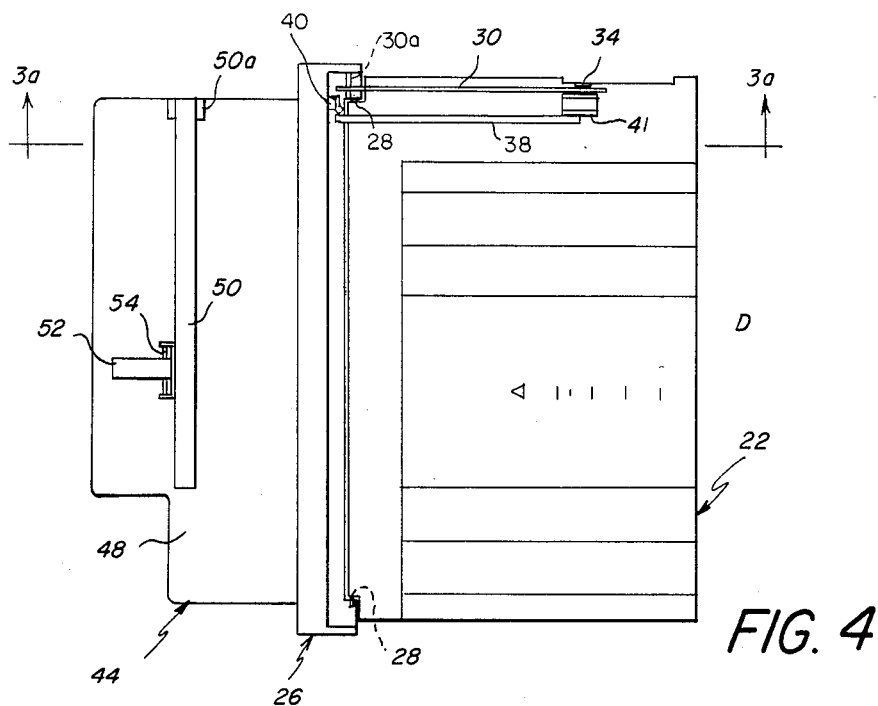
FIG. 4 is a top plan view, on an enlarged scale, of the continuous forms supply hopper in its operative position, with portions broken away to facilitate viewing.

Referring now to the accompanying drawings, FIG. 1 shows an exemplary reproduction apparatus 10 capable of operating in a mode for making copies of information contained on individual panels of continuous forms. The apparatus 10 includes a drive unit 12 (e.g. see aforementioned U.S. Pat. Nos. 4,087,172 or 4,264,200) which transports forms across the platen of the reproduction apparatus where they are exposed for copying. A hopper 14 adjacent to an exit aperture 16 receives the copies seriatim made of the panels of the continuous form. A collapsable compact supply hopper for continuous forms, according to this invention, and designated generally by the numeral 18, is shown in its storage position above the exit aperture 16 of the apparatus 10. In its storage position, the supply hopper 18 has a substantially flat surface 20 which forms a suitable work surface for resting documents to be copied or reproductions of copied documents for example. Of course, the reproduction apparatus 10 and continuous forms drive unit 12 are only illustrative, the supply hopper 18 being suitable for use with any other reproduction apparatus or printer capable of handling continuous forms.

The continuous forms supply hopper 18 includes a base plate 22 secured to the surface 24 of the reproduction apparatus 10 above the exit aperture 16. A first side member 26 is pivotally secured to the plate 22, adjacent to a marginal edge thereof, by a pivot pin 28 (see FIG. 3, 3a). Accordingly, the side member is movable from a storage position overlying the plate 22, as shown in FIG. 1, to an operative position, substantially perpendicular to the plate as shown in FIGS. 2, 3, 3a and 4. A linkage arm 30 controls the location of the member as it moves from its storage position to its operative position substantially perpendicular to the plate 22. The linkage arm 30, which is pivotally connected to the member 26 by a pin 30a, has a slot 32. A pin 34 supported on the plate 22 is received in the slot 32. The dimension of the slot 32 assures the substantially perpendicular orientation of the member 26 with respect to the plate 22 when the member is moved to its operative position.

The member 26 has a first internal recess 36. A second member 38 is pivotally secured to the member 26 by a spring loaded pivot pin 40 (see FIG. 3a) located within the recess 36 adjacent to a marginal edge thereof (the rear marginal edge in FIGS. 3, 3a and 4). In the storage position for the member 26, the member 38 is located within the recess 36 and as such overlies the base plate 22. When the member 26 is moved to its operative position perpendicular to the base plate 22, the spring action of the pivot pin 40 urges the member 38 to an operative position where it engages a stop member 42 located on the base plate 22 (see FIG. 4). The member 38, in this operative position, is substantially perpendicular to the plate 22 and the member 26. In this manner the member 26, the member 38 and the base plate 22 form three sides of the supply hopper upon which the continuous form stack S (see FIG. 3) is supported with the top portion 26a of member 26 substantially above the height of the stack. A decal D on the base plate 22 (see FIG. 4) has lines inscribed to facilitate location of continuous forms stacks of different individual panel dimensions respectively. Thus the stack can be accurately aligned in the hopper 18 for proper feeding across the platen of the apparatus 10 for copying. Additionally, the member 38 serves to prevent the stack from falling off the hopper 18 when the surface 24 of the reproduction apparatus 10 is raised, such as by pivoting about a rear marginal edge (in FIG. 1), to access the copy sheet exit path beneath the surface.

Figure 3:
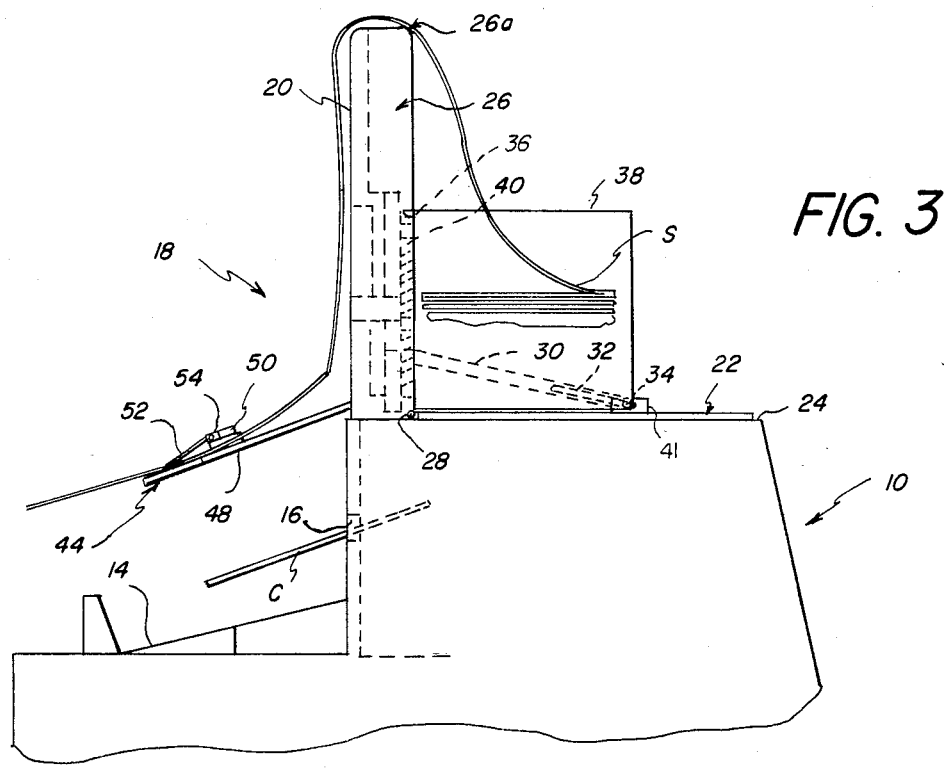
FIG. 3 is a side elevational view on an enlarged scale, partly in cross-section, of the continuous forms supply hopper in its operative position and a portion of the reproduction apparatus, with portions broken away to facilitate viewing.
Figure 3A:
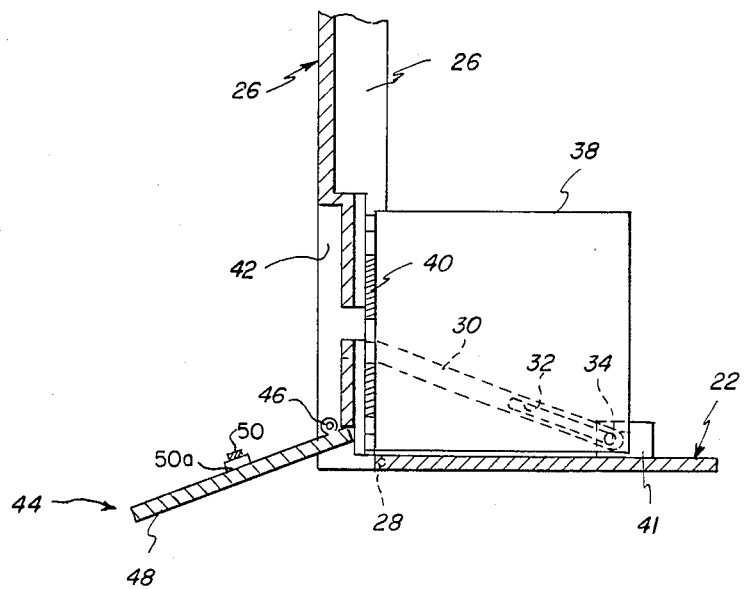
FIG. 3a is a cross-sectional side elevational view taken along the lines 3a—3a of FIG. 4.

The member 26 has a second internal recess 42 opposite recess 36. The recess 42 serves as a receptacle for a guide assembly 44. That is, when the member 26 is in its storage position, the guide assembly is received within the recess 42 so that the surface 20 is flat as described above. The guide assembly 44 includes a platform 48 pivotally connected to the member 26 by a pivot pin 46 located within the recess 42 (see FIGS. 2 and 3a). The assembly 44 is thus movable to the storage position within the recess 42, or to an operative position (see FIGS. 2, 3, 3a and 4). A guide bar 50 is supported in spaced relation to the platform 48 by means of a mounting block 50a secured to the platform adjacent to one marginal edge thereof. An elongated arm 52 is pivotally connected to the guide bar 50 by a pivot pin 54 so that the longitudinal axis of the arm lies in the direction of travel of the continuous forms when such forms are fed for copying. The arm 52 is weighted such that the end thereof opposite the pivot pin 54 rests on the platform 48 when the guide assembly 44 and member 26 are in their operative positions. The bar 50 and arm 52 are received in a slot 42' of recess 42 when the guide assembly 44 is in its storage position. As best seen in FIG. 3a, the end of the platform 48 on the opposite side of the pin 46 from the guide bar 50 engages a portion of the interior wall of the recess 42. Such engagement serves to locate the platform 48, in its operative position, to extend over the exit aperture 16 and hopper 14 in such a manner that continuous forms fed from the stack S do not interfere with copies exiting from the aperture 16 (e.g. copy C in FIG. 3) to the hopper 14.

In operation, the continuous forms are threaded from the stack S over the top portion 26a of the member 26 and under the guide bar 48 and arm 52 so as to lie between the guide bar and the platform 48. From there the forms are fed by the unit 12, for example, across the copier platen so that copies of the information on the panels can be reproduced respectively. The direction of travel for the continuous forms, as determined by the operative positions of the member 26 and the guide assembly 44 (i.e., first in a sharply upward direction from the stack S and then in a sharply downward direction between the guide bar 50, arm 52 and platform 44) insures separation of the individual panels from their face-to-face relation in the stack. The continuous forms are thus fed seriatim and double feeds, which might otherwise occur are prevented.

The invention has been described in detail with particular reference to a preferred embodiment thereof, but it will be understood that variations and modifications can be effected within the spirit and scope of the invention.

I claim:

1. A collapsable compact supply hopper for continuous forms, said supply hopper comprising:
   means for supporting a stack of continuous forms;
   a side member pivotally connected to said support means for movement to a storage position overlying said support means and to an operative position substantially perpendicular to said support means; and
   means, operatively coupled to said side member and cooperating therewith, for guiding continuous forms, fed from a stack on said support means over said side member when said side member is in its operative position, such that the continuous forms are fed in one direction and then in a substantially opposite direction to prevent double feeds of such continuous forms, said guiding means and said side member forming a flat surface when said member is in its storage position.

2. The invention of claim 1 wherein said guiding means comprises an elongated platform pivotally connected to said side member, a guide bar supported in spaced relation to said platform, and means for urging continuous forms received between said guide bar and said platform into engagement with said platform.

3. The invention of claim 2 wherein said support means is a plate, and said side member is connected to said plate adjacent to a marginal edge thereof; and wherein said elongated platform is connected to said side member on the opposite side thereof from said plate when said member is in its operative position.

4. The invention of claim 1 wherein said side member defines a recess adapted to receive said guiding means when said member is in its storage position.

5. The invention of claim 1 wherein a second side member is pivotally connected to said first mentioned side member for movement to a storage position overlying said support means when said first mentioned side member is in its storage position, and to an operative position relative to said support means and said first mentioned side member when said first mentioned side member is in its operation position.

6. In combination with a reproduction apparatus adaptable to copy information from continuous forms, a collapsable compact supply hopper for such continuous forms, said hopper comprising:

a base plate mounted on said reproduction apparatus, said base plate being adapted to support a stack of continuous forms;

a first side member pivotally connected to a marginal edge of said base plate for movement to a storage position overlying said base plate and to an operative position substantially perpendicular to said base plate;

a second side member pivotally connected to said first side member for movement to a storage position overlying said base plate when said first side member is in its storage position, and to an operative position substantially perpendicular to said first side member and said base plate when said first side member is in its operative position; and means, operatively coupled to said first side member and cooperating therewith, for guiding continuous forms, fed from a stack on said base plate over said first side member when such member is in its operative position, such that the continuous forms are fed in one direction and then in a substantially opposite direction to prevent double feeds of such continuous forms, said guiding means and said first side member forming a flat surface when such member is in its storage position.

7. The invention of claim 6 wherein said guiding means comprises an elongated platform pivotally connected to said first side member, a guide bar supported in spaced relation to said platform for receiving continuous forms between said guide bar and said platform, and means for urging continuous forms received between said guide bar and said platform into engagement with said platform.

8. The invention of claim 7 wherein said elongated platform is connected to said first side member on the opposite side thereof from said base plate when such member is in its operative position.

9. The invention of claim 7 wherein said reproduction apparatus includes a housing defining a copy exit aperture, and a hopper adjacent to such aperture for receiving said copies; and wherein said base plate is mounted adjacent to said exit aperture, and said elongated platform is spaced above said copy receiving hopper, whereby fed continuous forms are prevented from interfering with copies exiting from said exit aperture.

10. The invention of claim 6 wherein said first side member has a recess adapted to receive said second side member and said guiding means respectively when said first side member is in its storage position.

* * * * *